(12) United States Patent
Ahmed

(10) Patent No.: US 7,452,619 B2
(45) Date of Patent: Nov. 18, 2008

(54) FUEL CELL SYSTEM

(75) Inventor: Khaliq Ahmed, Rowville (AU)

(73) Assignee: Ceramic Fuel Cells Limited, Noble Park Victoria (AU)

( * ) Notice: Subject to any disclaimer, the term of this patent is extended or adjusted under 35 U.S.C. 154(b) by 414 days.

(21) Appl. No.: 10/468,649

(22) PCT Filed: Feb. 11, 2002

(86) PCT No.: PCT/AU02/00128

§ 371 (c)(1),
(2), (4) Date: Dec. 15, 2003

(87) PCT Pub. No.: WO02/067351

PCT Pub. Date: Aug. 29, 2002

(65) Prior Publication Data

US 2006/0166054 A1    Jul. 27, 2006

(30) Foreign Application Priority Data

Feb. 21, 2001 (AU) .................... PR3242

(51) Int. Cl.
*H01M 8/04* (2006.01)
*H01M 8/00* (2006.01)
*H01M 8/18* (2006.01)

(52) U.S. Cl. .............. 429/17; 429/13; 429/19; 429/20; 429/24

(58) Field of Classification Search ........... 429/17, 429/13, 19, 20, 24
See application file for complete search history.

(56) References Cited

U.S. PATENT DOCUMENTS 5,034,287 A * 7/1991 Kunz ................. 429/13
5,198,310 A * 3/1993 Fleming et al. ......... 429/17
5,993,984 A * 11/1999 Matsumura et al. ...... 429/17

FOREIGN PATENT DOCUMENTS

| EP | 0673074 A1 | 9/1995 |
| JP | 6-325783 A | 11/1994 |
| JP | 7-272742 A | 10/1995 |
| JP | 11-025997 | * 1/1999 |
| JP | 11-025997 | 4/1999 |
| WO | WO 01/13452 A1 | * 2/2001 |

* cited by examiner

*Primary Examiner*—Patrick Ryan
*Assistant Examiner*—Angela Martin
(74) *Attorney, Agent, or Firm*—Birch, Stewart, Kolasch & Birch, LLP

(57) ABSTRACT

A process for producing electricity in a fuel cell which comprises: a) pre-reforming a higher carbon (C2+) hydro-carbon fuel in a pre-reformer under conditions effective to achieve substantially complete conversion of higher carbon (C2+) hydro-carbons to produce a pre-reformed fuel stream; b) subjecting the pre-reformed fuel stream to methanation under conditions effective to produce a fuel stream having an increased concentration of methane relative to the pre-reformed fuel stream; and c) supplying the fuel stream and an oxidant to a high temperature fuel cell in which methane is reformed and electricity is produced by reacting the fuel stream at an anode of the fuel cell and reacting the oxidant at a cathode of the fuel cell.

11 Claims, 1 Drawing Sheet

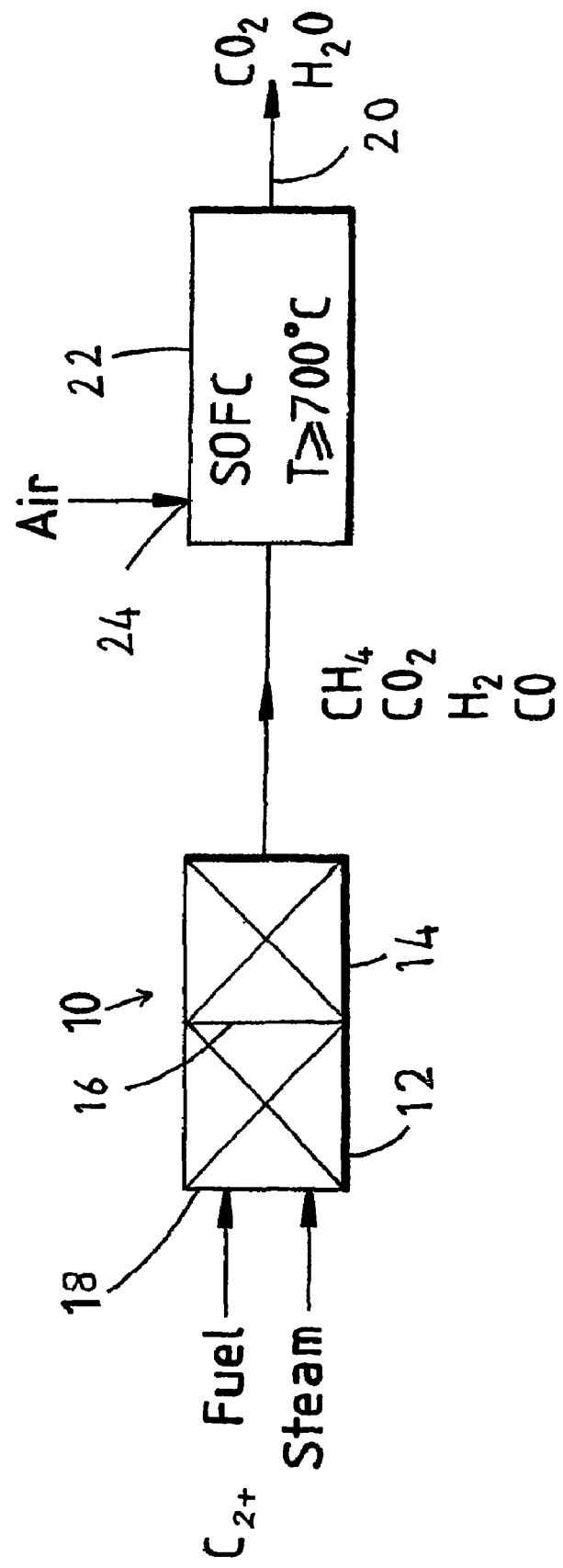

FUEL CELL SYSTEM

This application is the national phase under 35 U.S.C. § 371 of PCT International Application No. PCT/AU02/00128 which has an International filing date of Feb. 11, 2002, which designated the United States of America.

TECHNICAL FIELD

The present invention relates to fuel cells and is particularly concerned with the fuel supply to a fuel cell electrical power generating system.

BACKGROUND ART

Fuel cells convert gaseous fuels (such as hydrogen, natural gas and gasified coal) via an electrochemical process directly into electricity. A fuel cell continuously produces power when supplied with fuel and oxidant, normally air. A typical fuel cell consists of an electrolyte (ionic conductor, $H^+$, $O^{2-}$, $CO_3^{2-}$ etc.) in contact with two electrodes (mainly electronic conductors). On shorting the cell through an external load, fuel oxidises at the anode resulting in the release of electrons which flow through the external load and reduce oxygen at the cathode. The charge flow in the external circuit is balanced by ionic current flows within the electrolyte. Thus, at the cathode oxygen from the air or other oxidant is dissociated and converted to oxygen ions which migrate through the electrolyte membrane and react with the fuel at the anode/electrolyte interface. The voltage from a single cell under load conditions is in the vicinity of 0.6 to 1.0 V DC and current densities in the range 100 to 1000 $mAcm^{-2}$ can be achieved.

Several different types of fuel cells have been proposed. Amongst these, the solid oxide fuel cell (SOFC) is regarded as the most efficient and versatile power generation system, in particular for dispersed power generation, with low pollution, high efficiency, high power density and fuel flexibility. SOFC's operate at elevated temperatures, for example 700-1000° C. Other fuel cells which operate at elevated temperatures include the molten carbonate fuel cell requiring a minimum temperature of 650° C. However, SOFC's are the primary interest for the invention and further discussion herein will be mainly directed to these without intending to be limited in any way.

Numerous SOFC configurations are under development, including the tubular, the monolithic and the planar design. The planar or flat plate design is the most widely investigated. Single planar SOFC's are connected via interconnects or gas separators to form multi-cell units, sometimes termed fuel cell stacks. Gas flow paths are provided between the gas separators and respective electrodes, for example by providing gas flow channels in the gas separators. In a fuel cell stack the components—electrolyte/electrode laminates and gas separator plates—are fabricated individually and then stacked together. With this arrangement, external and internal co-flow, counter-flow and cross-flow manifolding options are possible for the gaseous fuel and oxidant.

Traditionally hydrogen, usually moistened with steam, has been used as a fuel cell fuel. However, in order to be economically viable the fuel must be as cheap as possible. One relatively cheap source of hydrogen is natural gas, primarily methane with a small proportion of heavy hydrocarbons ($C_{2+}$). Natural gas is commonly converted to hydrogen in a steam reforming reaction, but the reaction is endothermic and, because of the stability of methane, requires a reforming temperature of at least about 650° C. for substantial conversion and a higher temperature for complete conversion. While high temperature fuel cell systems produce heat which must be removed, heat exchangers capable of transferring thermal energy at the required level of at least about 650° C. from the fuel cells to a steam reformer are expensive. Thus, hydrogen produced by steam reforming natural gas may not be a cheap source of fuel.

One proposal of a fuel cell electricity generation process in which a hydrocarbon fuel is converted to a fuel cell fuel stream including hydrogen in a steam pre-reformer is disclosed in EP-A-0435724. The temperature in the pre-reformer is described as 700 to 850° C. with a resultant product-gas composition of 65-80 vol % $H_2$, 5-20 vol % CO, and 5-25 vol % $CO_2$.

Another such proposal is disclosed in U.S. Pat. No. 5,302,470 in which the steam pre-reforming reaction is said to be carried out under similar conditions to those of known steam reforming reactions: for example, an inlet temperature of about 450 to 650° C., an outlet temperature of about 650 to 900° C., and a pressure of about 0 to 10 $kg/cm^2$.G to produce a fuel cell fuel stream which is composed mainly of hydrogen and is fed to the fuel cell anode via a carbon monoxide shift converter.

Hydrocarbon fuels suggested for use in the above two proposals include, in addition to natural gas, methanol, kerosene, naphtha, LPG and town gas.

It has been proposed to alleviate the aforementioned problem of the cost of substantially complete steam pre-reforming of methane by using natural gas as a fuel source for a high temperature planar fuel cell stack and subjecting the natural gas to steam reforming within the stack, at a temperature of at least about 650° C., using catalytically active anodes. However, this arrangement can lead to carbon disposition problems on the anode from $C_{2+}$ hydrocarbons and is not suited to other higher hydrocarbon fuels for this reason. Furthermore, given the endothermic nature of the methane steam reforming reaction, too much methane in the fuel stream can lead to excessive cooling of the fuel cell stack. To alleviate this problem the fuel stream has been restricted to a maximum of about 25% methane (on a wet basis) with the natural gas being subjected to partial steam pre-reforming at elevated temperatures approaching 700° C. upstream of the fuel cell stack.

Another process for producing electricity in a fuel cell from hydrocarbon fuels such as gasified coal, natural gas, propane, naphtha or other light hydrocarbons, kerosene, diesel or fuel oil is described in EP-A-0673074. As described in that specification, the process involves steam pre-reforming approximately 5 to 20% of the hydrocarbon fuel at a temperature of at least 500° C. after start-up to convert ethane and higher hydrocarbons in that fraction to methane, hydrogen and oxides of carbon and to achieve a measure of methane pre-reforming in that fraction to oxides of carbon and hydrogen. Steam pre-reforming at this lower temperature alleviates carbon deposition in the pre-reformer. The hydrocarbon fuel with the steam pre-reformed fraction is then supplied to fuel inlet passages of the fuel cell stack which are coated with or contain a catalyst for steam reforming of the methane and remaining hydrocarbon fuel at 700-800° C. into hydrogen and oxides of carbon which are supplied to the anodes in the fuel cell stack.

Indirect internal steam reforming of the remaining hydrocarbon fuel within the fuel inlet passages is said to allow the use of reforming catalysts within the fuel inlet passages which are less likely to produce coking or carbon deposits from the internal steam reforming of the higher hydrocarbons than nickel cermet anodes. It is believed that steam pre-reforming of the hydrocarbon fuel in the described temperature range is restricted to 5 to 20% of the fuel in order to relatively increase the level of hydrogen in the fuel stream to the fuel cell stack and thereby alleviate carbon deposition when the fuel is internally reformed in the stack.

An alternative approach to providing a fuel stream for a fuel cell in which the proportion of methane derived from a higher carbon ($C_{2+}$) hydrocarbon fuel is increased is disclosed in our International Patent Application No PCT/AU00/00974 filed 16 Aug. 2000, the contents of which are incorporated herein by reference. In this proposal all the fuel is reacted with steam in a steam pre-reformer at a temperature in the pre-reformer of no greater than 500° C. to produce a fuel stream including hydrogen and no less than about 20% by volume methane (measured on a wet basis). The fuel stream is reacted at the anode of the fuel cell to produce electricity when an oxidant such as air is reacted at the fuel cell cathode.

By this proposal, any of a wide range of higher hydrocarbon fuels may be used, and the lower pre-reforming temperature of no greater than 500° C. not only results in a greater proportion of methane being produced but also enables a simpler and therefore cheaper pre-reformer system to be adopted.

It has been found advantageous to increase the proportion of methane in the fuel stream to a high temperature fuel cell in which the methane is internally reformed on the anode because consumption of the heat released from the exothermic fuel cell reaction by the endothermic steam/methane internal reforming reaction leads to better thermal management of the fuel cell. In turn this provides improved fuel cell efficiency because of reduced parasitic losses associated with cooling strategies otherwise required for the fuel cell. Any additional methane content in the fuel stream replacing hydrogen means more internal reforming and therefore lessened requirement for cell cooling which is normally achieved by flowing excess air through the cathode side of the fuel cell. However, a disadvantage of the proposal in PCT/AU00/00974 is that it is seeking to balance the production of methane in the fuel stream against the desire to pre-reform all the higher hydrocarbons in the initial fuel. Temperatures towards the upper limit of the range (no greater than 500° C.) defined in that application, or higher, may be required for full conversion of the higher hydrocarbons (because of practical limitations imposed by reaction kinetics and/or catalyst effectiveness), but thermodynamics require a temperature lower than this to optimize the proportion of methane in the fuel stream. The present invention seeks to alleviate this disadvantage.

SUMMARY OF THE INVENTION

Accordingly, the present invention provides process for producing electricity in a fuel cell which comprises:
- a) pre-reforming a higher carbon ($C_{2+}$) hydrocarbon fuel in a pre-reformer under conditions effective to achieve substantially complete conversion of higher carbon ($C_{2+}$) hydrocarbons to produce a pre-reformed fuel stream;
- b) subjecting the pre-reformed fuel stream to methanation under conditions effective to produce a fuel stream having an increased concentration of methane relative to the pre-reformed fuel stream; and
- c) supplying the fuel stream and an oxidant to a high temperature fuel cell in which methane is reformed and electricity is produced by reacting the fuel stream at an anode of the fuel cell and reacting the oxidant at a cathode of the fuel cell.

In the process of the invention the necessary conditions to achieve substantially complete conversion of higher carbon hydrocarbons in the fuel may yield a methane lean (less than 20% by volume methane measured on a wet basis) fuel stream (mixture) by thermodynamically and/or kinetically favouring formation of hydrogen and a carbon oxide over formation of methane. Such thermodynamic and/or kinetic limitations may even convert some or all of the methane originally present in the higher carbon hydrocarbon fuel into hydrogen and a carbon oxide. However, it is desirable to include methane in the fuel for the fuel cell for internal reforming at the anode. In the process of the present invention the methane content of the fuel is subsequently enhanced by use of a methanator downstream of the pre-reformer, and the methanation is operated under conditions effective to produce a methane enriched fuel stream for the fuel cell. The crux of the invention resides in operating the pre-reformer in such a way to achieve the desired level of conversion of higher hydrocarbons and using a methanator to boost the methane content of the fuel prior to feeding it to the fuel cell. Use of the methanator may remedy any loss in methane concentration in the fuel following pre-reforming.

Typically, the temperature of the pre-reformer operation is adjusted to achieve the desired conversion though other parameters may also be varied. Similarly, it is the temperature of the methanator that is usually adjusted to provide the desired control of the methanation reaction. Usually, the methanator is operated at a temperature of from 250 to 450° C.

In one embodiment the higher carbon hydrocarbon fuel is reacted with steam in a steam pre-reformer to produce a pre-reformed fuel mixture comprising methane, hydrogen and carbon oxides. In this embodiment the steam pre-reformer is usually operated at a temperature of at least 300° C. Thus, in this embodiment the present invention provides a process for producing electricity in a fuel cell which comprises reacting a higher carbon ($C_{2+}$) hydrocarbon fuel in a steam pre-reformer at a temperature in the pre-reformer of at least 300° C. to produce a mixture of methane, hydrogen and oxides of carbon, subjecting the mixture to methanation at a temperature in a range of 250° C. to 450° C. which is less than the pre-reforming temperature to produce a fuel stream having an increased level of methane relative to the mixture, and supplying the fuel stream and an oxidant to a high temperature fuel cell in which the methane is reformed and electricity is produced by reacting the fuel stream at an anode of the fuel cell and reacting the oxidant at a cathode of the fuel cell.

In another embodiment the higher carbon hydrocarbon fuel is subjected to partial oxidation over a suitable catalyst to produce a mixture containing hydrogen and carbon monoxide. Typically, the partial oxidation takes place at a temperature of at least 400° C., preferably at least 500° C.

In yet another embodiment the higher carbon hydrocarbon fuel is processed using an autothermal reformer. The autothermal reformer combines catalytic partial oxidation and steam reforming reactions. The catalytic partial oxidation provides the heat for the endothermic steam reforming reaction. Following autothermal reforming the mixture prior to methanation comprises hydrogen, carbon monoxide and carbon dioxide. Typically, the autothermal reformer is operated at a temperature of at least 400° C., preferably at least 500° C.

Invariably, the subsequent methanation takes place at a temperature which is lower than that suitable for pre-reforming of the fuel and which is from 250 to 450° C. Management of the temperature regime for the fuel pre-reforming and methanation reactions favours conversion of higher carbon hydrocarbons in the fuel stream and subsequent methane formation.

By the present invention all of the advantages of the invention described in PCT/AU00/00974 can be achieved, that is a substantially wider source of fuel for the fuel cell than just methane and/or hydrogen, including ethane and liquid higher hydrocarbons such as propane, butane, liquefied petroleum gas (LPG), gasoline (petrol), diesel, kerosene, fuel oil, jet oil, naphtha and mixtures of these, relatively small reactor or reactors for the fuel processing and methanation reactions, and, due to the relatively low operating temperatures, simplified and therefore cheaper equipment for the fuel processing and the methanation. The fuel source may include non-higher hydrocarbons, such as methane, but preferably the higher hydrocarbons form the major component of the fuel source. The preferred fuel is selected from LPG, gasoline (petrol) and diesel.

In addition, the present invention allows both the reforming of the higher hydrocarbons and the production of methane to be optimised by separating the two steps at temperatures in the respective ranges. For instance, with reference to steam pre-reforming and methanation, the invention involves the following reactions.

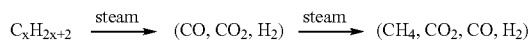

$$C_xH_{2x+2} \xrightarrow{steam} (CO, CO_2, H_2) \xrightarrow{steam} (CH_4, CO_2, CO, H_2)$$

In one aspect, the concept of the present invention concerns lowering the temperature of a pre-reformed gas mixture, as a lower temperature favours methanation of hydrogen and carbon oxides, formed from the processing of the higher hydrocarbons at a higher temperature, and thus increasing methane yield. In the present invention this is done by passing the pre-reformed gas mixture over a reforming/methanation catalyst in a reactor bed/reaction zone which is held at a temperature that is somewhat lower than the pre-reformer temperature. Conceptually, the methanation temperature only needs to be sufficiently lower than the pre-reforming temperature so that a reasonable increase in methane content is achieved. Thermodynamic calculations and experimentation have demonstrated that lowering the temperature by about 50° C. relative to the fuel pre-reforming temperature is capable of giving a significant boost to methane content of the fuel stream to the fuel cell, but smaller or greater temperature differences may be adopted.

Advantageously, the fuel pre-reforming and methanation may be carried out in a single reactor having a first heating zone for fuel pre-reforming and a second zone for methanation. Interstage cooling may be provided between respective catalyst beds in a single reactor, for example by means of a heat exchanger which may or may not be finned, and the two zones may have independent heating controls. Alternatively, two separate reactors may be provided in series, for example with independent heating controls, with the higher temperature reactor being first.

The size of the fuel pre-reforming reactor or heating zone will be partly dependent on the selected temperature as lower temperatures usually require lower space velocities and therefore larger volume. The size of the methanation reactor or heating zone will also be partly dependent upon the fuel processing temperature since this will affect the proportion of hydrogen and oxides of carbon relative to methane in the mixture.

When employed, steam pre-reforming is preferably performed at a temperature no greater than about 550° C., more preferably in the range of 350 to 450° C., and preferably the methanation is performed at a lower temperature in the range 300 to 400° C., more preferably 325 to 350° C. Heat may be supplied during the pre-reforming process, but preferably the pre-reforming and methanation processes are performed adiabatically so that the specified operating temperature is the respective inlet temperature.

A variety of different steam reformers and methanators have been proposed and any of these may be adopted, bearing in mind the defined operating temperature ranges, and the fact that both reactions may be performed in different zones of same the reactor. The common pre-reformer methanator catalysts are nickel-based, but may comprise, for example, platinum, rhodium, other precious metal, or a mixture of any of these. Steam pre-reforming and methanation are conveniently performed at atmospheric pressure, but higher pressures may be adopted if desired, for example up to 10 kgcm$^{-2}$G.

Commonly, steam reforming of hydrocarbons and methanation of hydrogen and oxides of carbon are carried out at a steam to carbon (S/C) ratio of greater than 2. In the present invention, this however would result in significant dilution of the resultant fuel stream with steam and thus reduction in the fuel value. For example, in the steam pre-reforming, for butane ($C_4H_{10}$), eight volume parts of steam must be added to one volume part of fuel for an S/C ratio of 2. For diesel ($C_{10}$), twenty parts of steam must be added to one part of fuel to achieve an S/C ratio of 2, with the result that there is strong fuel dilution, leading to inefficient electricity production. Preferably therefore, the S/C ratio in the pre-reformer and methanator are below 1.5, more preferably below 1.25 and most preferably below 1.

Potential carbon deposition problems at the proposed low steam to carbon ratios are alleviated by the mild conditions used in the pre-reformer and methanator. If pre-reforming and methanation are carried out at very low steam to carbon ratios, additional steam may be introduced to the fuel stream entering the fuel cell. Advantageously, the addition of steam may be provided by recycling some of the anode exhaust stream.

When employed catalytic partial oxidation usually takes place in a first catalytic zone over a catalyst suitable for catalytic oxidation of the higher carbon hydrocarbon fuel. Typically, the catalyst comprises platinum, palladium or rhodium, preferably platinum and palladium, provided on a refractory metal oxide such as alumina, supported on a monolithic body. Useful catalysts supports and autothermal reforming reactors are known in the art and are commercially available. Desirably, the catalyst used to effect catalytic partial oxidation is effective in the presence of sulfur compounds. The temperature of this first catalytic zone is typically 400° C. to 900° C.

When used, an autothermal reformer uses the same kind of catalyst described for the catalytic partial oxidation. The steam reforming catalyst of the autothermal reformer is typically provided in a second catalyst zone. The catalyst used for the steam reforming reaction may comprise any of the catalytic metals known to be useful for steam reforming, such as nickel, cobalt, platinum and ruthenium and mixtures thereof. The catalyst may be used in the form of a particulate bed or supported on an inert carrier support, as mentioned above for the partial oxidation catalyst. The autothermal reformer is usually operated at a temperature of 300 to 900° C., preferably 400 to 800° C. The pressure is usually from 1 to 10, preferably, from 1 to 5, atmospheres.

The catalysts for the partial oxidation and steam reforming reactions may be provided in a single reaction zone within the vessel used for autothermal reforming.

The following equations summarise the catalytic partial oxidation and steam reforming of and higher carbon hydrocarbons ($C_xH_y$) (reactions 1-3):

$$C_xH_y + (2x+y/2)O_2 \rightarrow xCO_2 + y/2 H_2O \quad (1) \text{ Combustion}$$

$$C_xH_y + x/yO_2 \rightarrow xCO + y/2 H_2 \quad (2) \text{ Partial oxidation}$$

$$C_xH_y + H_2O \rightarrow CH_4 + CO + H_2 \quad (3) \text{ Steam reforming}$$

$$CO + H_2O \rightarrow H_2 + CO_2 \quad (4)$$

Reaction (4) is the water-gas shift reaction which is normally at equilibrium.

Generally, the pre-reforming process will be carried out such that the $C_{2+}$ hydrocarbon fuel is resident over the catalyst used in the reforming for a sufficient time to ensure at least substantially complete conversion of the $C_{2+}$ hydrocarbons, for example to less than about 0.1% by volume (on a dry basis) in the mixture from the pre-reformer. This alleviates deposition of carbon on the anode of the fuel cell when heavier hydrocarbons are reformed on the anode. However, some $C_{2+}$ hydrocarbons may be present in the mixture and in the resultant fuel stream, and preferably there is 97.5% or greater conversion of the $C_{2+}$ hydrocarbons in the pre-reforming. More preferably, there is no more than about 0.5 vol % $C_{2+}$ hydrocarbons present in the fuel stream to the anode measured on a dry basis. If methane is consumed in the pre-reforming step it is regenerated and the concentration thereof boosted in the subsequent methanation.

Generally, the methanation process will be carried out such that the hydrogen and oxides of carbon in the pre-reformed mixture are resident over the methanation catalyst for a sufficient time to ensure complete methanation under the prevailing thermodynamic conditions.

Generally, the methane content of the fuel stream resulting from methanation will be at least 40% by volume, more preferably at least about 50% by volume, even more preferably at least about 60% by volume, and possibly at least about 70% by volume, measured on a dry basis.

The $CH_4$ in the fuel stream is internally reformed within the fuel cell in the presence of steam during the oxidation reaction at the anode to produce a waste stream of $CO_2$ and $H_2O$. Steam present in the waste stream may be recycled to the fuel stream input of the fuel cell. The temperature in the fuel cell should be at least 650° C., more preferably at least 700° C. to ensure substantially complete reforming of the methane. In an SOFC the temperature is likely to be at least 700° C. so that complete reforming of the methane is likely to be achieved.

Preferably, the anode in the fuel cell comprises a nickel material, such as a nickel/zirconia cermet, which is used to catalyse the internal reforming reaction in the fuel cell. The fuel cell and its associated assembly can take any suitable form provided it operates at a temperature of at least 650° C. to provide at least substantial conversion of the methane in the internal reforming reaction. By way of example only, several different planar SOFC components and systems, SOFCs and materials are described in our International Patent Applications PCT/AU96/00140, PCT/AU96/00594, PCT/AU98/00437, PCT/AU98/00719 and PCT/AU98/00956, the contents of which are incorporated herein by reference, including the corresponding U.S. Pat. No. 5,942,349 and patent application Ser. Nos. 09/155,061, 09/445,735, 09/486,501 and 09/554,709, respectively. Other disclosures appear in our International patent applications PCT/AU99/01140, PCT/AU00/00630 and PCT/AU00/00631.

Generally, the fuel cell to which the fuel stream is supplied will be one of multiple fuel cells to which the fuel stream is also supplied, commonly called a fuel cell stack in the case of planar SOFCs. However, the invention also extends to the process being performed using a single fuel cell.

Generally, the heavy hydrocarbon fuel will pass through a desulphurising step upstream of the steam pre-reformer in order to alleviate sulphur poisoning the pre-reformer catalyst, the methanator catalyst and/or the anode. Desulphurising of heavy hydrocarbon fuels is well known and will not be described further herein.

The preferred relatively high levels of methane in the fuel stream to the fuel cell anode have the potential to cause excessive cooling of the fuel cell as a result of the endothermic methane internal steam reforming reaction. This problem is more likely to be encountered in a wholly ceramic SOFC fuel cell stack due to the low thermal conductivity of ceramic materials, but can be alleviated by incorporating metal or metallic components in the fuel cell stack, for example as the gas separators between individual fuel cells, to improve the thermal conductivity across the stack. Alternatively, or in addition, other means may be provided to alleviate excessive cooling at the fuel entry edge of each fuel cell assembly, including preheating of the fuel stream.

Advantageously, in the process of the invention waste heat from the fuel cell is recycled to the pre-reformer and methanator, which, as noted above, are preferably operated adiabatically. Since the pre-reformer and methanator are only required to operate at relatively low temperatures, any heat exchanger transferring the waste heat to them may be of relatively simple construction and be formed of relatively low-cost materials.

DESCRIPTION OF THE PREFERRED EMBODIMENT

One embodiment of a process in accordance with the invention will now be illustrated by way of example only with reference to the accompanying drawings which is a block diagram of the process illustrating a typical steam pre-reformer, a typical methanator and an SOFC stack.

Referring to the drawing, a vessel 10 comprises an upstream steam pre-reformer zone 12 containing a bed of nickel-based catalyst maintained at a temperature in the range 300 to 550° C. and a downstream methanation zone 14 containing a bed of nickel-based catalyst maintained at a lower temperature in the range 250 to 450° C. A heat rejector may be employed at or before the methanation zone 14 to achieve the required cooling. The pre-reformer zone 12 and methanation zone 14 are operated adiabatically, and the zones may take any typical form in which the mixture resulting from the pre-reformer zone 12 can be passed to the lower temperature methanation zone 14, optionally by way of a heat exchanger 16.

Desulphurised heavy hydrocarbon fuel ($C_{2+}$), such as LPG, is introduced to the vessel 10 at an inlet end 18 and steam is also introduced, at an S/C ratio of no greater than 2.0. The gas flows are such as to provide a sufficient residence time over the catalyst in the pre-reformer zone 12 to achieve at least a 97.5% conversion, and preferably at least substantially 100% conversion, of the heavy hydrocarbons to methane, hydrogen, carbon dioxide and carbon monoxide. At the preferred maximum temperature of 450° C., the resultant fuel mixture should have a minimum methane content, on a wet basis of about 20 vol % and preferably considerably higher at lower S/C values. The steam-containing fuel mixture from the pre-reformer zone 12 passes over the heat exchanger 16 to reduce its temperature and into the methanation zone 14 in which the catalyst is maintained at a lower temperature preferably in the range of 300 to 350° C. The gas flows in the methanation zone are such as to provide substantially complete methanation of the hydrogen and carbon oxides under the prevailing thermodyanmic conditions. At the preferred maximum temperature of 350° C. this may produce a fuel stream from the vessel 10 containing up to about 70% by volume methane on a dry basis.

The fuel stream, optionally with steam from an anode outlet side 20 of an SOFC stack 22 added to it, is introduced to the anode side of the stack. The fuel cells in the stack 22 operate at a temperature of at least 700° C. and when the fuel stream contacts the nickel/zirconia cermet anodes of the fuel cells the methane in the fuel stream is steam reformed to carbon monoxide and hydrogen.

At the same time oxygen, in the form of air, is supplied to the cathode side 24 of the fuel cell stack and, when the fuel cell stack is short-circuited through an external load (not shown), the fuel oxidises at the anodes producing electricity and resulting in a $CO_2$ and $H_2O$ waste stream at the anode outlet side 20.

Waste heat from the SOFC stack 22 is advantageously recycled to the vessel 10.

EXAMPLES

Thermodynamic Calculation

The process of the invention is shown to be feasible by carrying out the thermodynamic calculations, in Examples 1 and 2, and the calculations are compared with corresponding calculations for a process in accordance with PCT/AU00/00974.

Example 1

Case 1: A single-stage reformer operated at 400° C.

Case 2: A two-stage reformer with the first stage operated at 450° C. and the second stage at 350° C.

A pure propane feed with a steam-to-carbon ratio of 1.5 is used in these calculations.

The results are as follows:

| Case 1: | Methane: | 56.45% | (v/v) |
|---|---|---|---|
| | Hydrogen: | 24.71 | |
| | Carbon Dioxide: | 18.34 | |
| | Carbon Monoxide: | 0.50 | |
| Case 2 | Methane: | 66.48% | (v/v) |
| | Hydrogen: | 15.52 | |
| | Carbon Dioxide: | 17.86 | |
| | Carbon Monoxide: | 0.14 | |

It may be seen that the resultant fuel stream methane content is higher in Case 2. In principle the methane content for Case 1 can be increased by operating at the lower temperature of 350° C. However, in practice most commercial catalysts will not have sufficiently high activity for full conversion of higher hydrocarbons at such low temperatures. Similarly, the temperature of the second stage of Case 2 can be lowered to 300° C. for higher methane content. Again, similar practical restrictions apply. From these considerations the above example is a reasonably practical one except for the fact that in practice the reformers (pre-reformer and methanator) will be operated adiabatically rather than isothermally.

Example 2

Case 1: A single-stage reformer operated at 380° C.

Case 2: A two-stage reformer with the first stage operated at 380° C. and the second stage at 334° C.

A pure propane feed with a steam-to-carbon ratio of 1.5 is used in these calculations.

The results are as follows:

| Case 1: | Methane: | 61.84% | (v/v) |
|---|---|---|---|
| | Hydrogen: | 22.45 | |
| | Carbon Dioxide: | 15.43 | |
| | Carbon Monoxide: | 0.28 | |
| Case 2: | Methane: | 71.4% | (v/v) |
| | Hydrogen: | 14.1 | |
| | Carbon Dioxide: | 14.4 | |
| | Carbon Monoxide: | 0.1 | |

Experimental Work

Example 3

Example 2 was experimented in a dual-bed microreactor. In the first experiment, the first bed was loaded with 1 g of the catalyst C11-PR, a commercial pre-reforming catalyst obtained from United Catalysts Inc. The experiment was performed with the first bed maintained at 380° C. and with no catalyst placed in the second bed. The experiment was therefore a comparative example in accordance with Case 1 of Example 2 and with the process of PCT/AU00/00974. The experiment was performed over a period of 100 hours. Steam-to-Carbon ratio was 1.5 and the space velocity of the reactant was 1250 h$^{-1}$. The results are as follows:

TABLE 1

Propane pre-reforming in a single-bed microreactor

| Hours On Stream | Gas Composition | | | | Selectivity |
|---|---|---|---|---|---|
| | $C_3H_8$ | $CO_2$ | $H_2$ | $CH_4$ | $CH_4/H_2$ |
| 2.2 | 0 | 13.6 | 25.8 | 60.5 | 2.35 |
| 4.8 | 0 | 13.7 | 25.3 | 60.8 | 2.4 |
| 7.3 | 0 | 13.6 | 26.2 | 60.0 | 2.29 |
| 25.3 | 0 | 13.9 | 23.82 | 61.6 | 2.59 |
| 27.8 | 0 | 13.9 | 24.8 | 61.2 | 2.47 |
| 30.3 | 0 | 13.8 | 25.3 | 60.7 | 2.4 |
| 96.8 | 0 | 13.8 | 25.5 | 60.5 | 2.37 |
| 99.3 | 0 | 13.7 | 26.2 | 59.9 | 2.29 |
| 101.8 | 0 | 13.7 | 26.3 | 59.8 | 2.28 |
| 102.8 | 0 | 13.7 | 26.5 | 59.7 | 2.25 |
| Average | 0 | 13.7 | 25.6 | 60.5 | 2.37 |

Example 4

In the second experiment, the first bed of the dual-bed microreactor was loaded with 0.5 g of the same catalyst and the second bed was loaded with another 0.5 g. The experiment was performed with the first bed maintained at 380° C. and the second bed 334° C. The experiment was therefore in accordance with Case 2 of Example 2 and with the present invention. Again, the experiment was performed over a period of 120 hours and the Steam-to-Carbon ratio and the space velocity of the reactant were the same as in the first experiment. The results are as follows:

TABLE 2

Propane pre-forming in a dual-bed microreactor

| Hours On Stream | Gas Composition | | | | Selectivity |
|---|---|---|---|---|---|
| | $C_3H_8$ | $CO_2$ | $H_2$ | $CH_4$ | $CH_4/H_2$ |
| 23.2 | 0 | 13.2 | 19.2 | 67.7 | 3.53 |
| 25.2 | 0 | 13.2 | 19.1 | 67.6 | 3.55 |
| 27.7 | 0 | 13.0 | 19.6 | 67.4 | 3.44 |
| 46.2 | 0 | 13.3 | 18.2 | 68.4 | 3.75 |
| 48.8 | 0 | 13.2 | 18.1 | 68.7 | 3.81 |
| 51.3 | 0 | 13.3 | 19.3 | 67.3 | 3.48 |
| 52.3 | 0 | 13.2 | 19.1 | 67.7 | 3.55 |
| 118.4 | 0 | 13.3 | 19.3 | 67.3 | 3.50 |
| 119.5 | 0 | 13.1 | 18.6 | 68.2 | 3.66 |
| Average | 0 | 13.2 | 18.9 | 67.8 | 3.6 |

The results show that the dual-bed reactor increases the methane content in the gas by 12% relative to the single-bed reactor, a distinct advantage for internal reforming solid oxide fuel cell systems. Furthermore, the carbon dioxide contents in Examples 3 and 4 are virtually unchanged within the limits of experimental errors which shows that the fuel is not diluted by any additional $CO_2$ formation in Example 4. Only the ratio of $CH_4/H_2$ is changed favourably towards high methane content in the pre-reformed gas.

The micro-reactor experiments show the feasibility of the concept. The methane content in the dual-bed reactor achieved in these experiments is lower than that expected from thermodynamics. This shows that in a full-scale reformer there is room for further optimisation of the operating conditions to achieve even higher methane content than that achieved in the microreactor experiments i.e. potentially up to about 71%. In terms of the methane content, the efficiency of the microreactor was 95%.

Unless otherwise specified, any reference herein to a volume percentage content of the fuel mixture or fuel stream is given on a dry basis that is without accounting for the steam present in the fuel mixture or fuel stream.

Those skilled in the art will appreciate that the invention described herein is susceptible to variations and modifications other than those specifically described. It is to be understood that the invention includes all such variations and modifications which fall within its spirit and scope. The invention also includes all of the steps and features referred to or indicated in this specification, individually or collectively, and any and all combinations of any two or more of said steps and features.

The reference to any prior art in this specification is not, and should not be taken as, an acknowledgment or any form of suggestion that that prior art forms part of the common general knowledge in Australia or elsewhere.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A process for producing electricity in a fuel cell which comprises:
    a) pre-reforming a higher carbon ($C_{2+}$) hydrocarbon fuel in a pre-reformer at a temperature of at least 300° C. under conditions effective to achieve substantially complete conversion of higher carbon ($C_{2+}$) hydrocarbons to produce a pre-reformed fuel stream containing methane, hydrogen and oxides of carbon;
    b) subsequently subjecting the pre-reformed fuel stream obtained in a) to methanation at a temperature in the range of 250° C. to 450° C. and which is less than the pre-reforming temperature under conditions effective to produce a fuel stream having an increased concentration of methane relative to the pre-reformed fuel stream; and
    c) supplying the fuel stream and an oxidant to a high temperature fuel cell in which methane is reformed and electricity is produced by reacting the fuel stream at an anode of the fuel cell and reacting the oxidant at a cathode of the fuel cell,
    wherein the methane content of the fuel stream resulting from methanation is at least 40% by volume (measured on a dry basis).

2. A process according to claim 1, wherein the higher carbon hydrocarbon fuel is pre-reformed by partial oxidation.

3. A process according to claim 2, wherein partial oxidation takes place at a temperature of at least 400° C.

4. A process according to claim 1, wherein the higher carbon hydrocarbon fuel is pre-reformed using an autothermal reformer.

5. A process according to claim 4, wherein the autothermal reformer is operated at a temperature of at least 400° C.

6. A process according to claim 1, wherein the fuel pre-reforming and methanation are carried out in a single reactor having a first healing zone for fuel pre-reforming and a second zone for methanation.

7. A process according to claim 1, wherein the fuel pre-reforming and methanation are carried out in two separate reactors provided in series.

8. A process according to claim 1, wherein pre-reforming results in 97.5% or greater conversion of $C_{2+}$ hydrocarbons.

9. A process according to claim 1, wherein there is no more than about 0.5 vol % (measured on a dry basis) $C_{2+}$ hydrocarbons present in the fuel stream to the fuel cell.

10. A process according to claim 1, wherein the fuel cell is operated at a temperature of at least 650° C.

11. A process according to claim 1, wherein waste heat from the fuel cell is recycled to the pre-reformer and/or methanator.

* * * * *